United States Patent
Aviles

(10) Patent No.: US 7,024,489 B2
(45) Date of Patent: Apr. 4, 2006

(54) SYSTEM AND METHOD FOR DISPARATE PHYSICAL INTERFACE CONVERSION

(75) Inventor: Joaquin Aviles, Austin, TX (US)

(73) Assignee: TippingPoint Technologies, Inc., Austin, TX (US)

( * ) Notice: Subject to any disclaimer, the term of this patent is extended or adjusted under 35 U.S.C. 154(b) by 1004 days.

(21) Appl. No.: 10/036,584

(22) Filed: Dec. 31, 2001

(65) Prior Publication Data

US 2003/0126296 A1  Jul. 3, 2003

(51) Int. Cl.
  *G06F 15/16* (2006.01)
(52) U.S. Cl. .......................................... 709/246; 710/71
(58) Field of Classification Search ................. 709/246; 710/71

See application file for complete search history.

(56) References Cited

U.S. PATENT DOCUMENTS 4,075,691 A * 2/1978 Davis et al. ................... 710/64
5,544,319 A * 8/1996 Acton et al. ................ 709/246
6,218,969 B1 * 4/2001 Watson et al. .............. 341/100
6,618,383 B1 * 9/2003 Tomlins .................... 370/395.5
6,715,010 B1 * 3/2004 Kumata ....................... 710/71

* cited by examiner

Primary Examiner—David Y. Eng
(74) Attorney, Agent, or Firm—Hamilton & Terrile, LLP

(57) ABSTRACT

A system and method provides for the conversion of disparate physical interfaces. The system and method includes one or more serial interfaces that interface with devices having disparate serial interfaces. One or more physical modules, associated with the serial interfaces, interface with one or more components having disparate physical interfaces but that do not support serial interfaces. The physical modules are able to interface with a variety of different components having different physical interfaces. A conversion module associated with the physical modules and the serial interfaces serializes or deserializes the data transmitted between the physical modules and the serial interfaces. A plurality of queues order the data transmissions between the components and the serial interfaces to prevent data bottlenecks. A backplane may be utilized as the facility for high speed communication allowing the components having disparate physical interfaces to interface with each other and the backplane.

48 Claims, 1 Drawing Sheet

SYSTEM AND METHOD FOR DISPARATE PHYSICAL INTERFACE CONVERSION

TECHNICAL FIELD OF THE INVENTION

This invention relates generally to computer networks, and more specifically relates to a system and method for disparate physical interface conversion.

BACKGROUND OF THE INVENTION

The Internet and computer networks have grown in popularity and use largely because of the increasing data transmission rates allowing for more information to be communicated at faster transfer rates. The increasing data transfer rates of the Internet and computer networks has lead to an explosion of growth in data traffic for business and personal usage. An industry has developed to provide computer networks and access to the Internet for businesses and homes. The businesses within this industry have invested heavily in infrastructure with the general goal of improving data transfer rates for customer end points. Thus, the Internet and computer area networks have evolved from low speed analog modem Internet connections provided through dial-up service across the plain old telephone system (POTS) into broadband access provided by cable modems, DSL, and ADSL as well as Packet-over-SONET (POS) Internet traffic and Gigabit Ethernet, 10 Gigabit Ethernet, and Asynchronous Transfer Mode (ATM) applications that are capable of transferring data at substantially higher rates.

As demand for computer networks and Internet-based services through these applications has increased, demand for capacity to transfer data at higher rates has also increased. Demand for higher data transfer rates has resulted in the development of new transmission technologies that transfer data at higher and higher rates. But the new transmission technologies often require new physical interfaces that support the higher data transfer rates of the new transmission technologies such as POS-PHY Level 3 (PL3), POS-PHY Level 4(PL4), and System Physical Interface (SPI).

Network interfaces as well as networking components such as network processors and framers generally support these new physical interfaces but do not typically support serial interfaces. This lack of serial interface support poses a problem when the network interfaces and network components must interact with other network components that only support serial interfaces. The lack of support for serial interfaces becomes particularly burdensome when a computer network uses a backplane design as the facility for high speed communication between the network components where the backplane provides a high speed serial interface. Since in a backplane design the network components use the backplane for communications, the physical interfaces of the network components must be converted to a serial interface so that the network components may communicate with the backplane and with each other through the backplane.

The use of the backplane as the facility for communication and to convert the disparate physical interfaces, such as parallel interfaces, of the network components into serial interfaces has resulted in multi-layer backplanes that perform numerous functions including converting to and from serial interfaces. A multi-layer backplane that provides high speed communication and that converts to and from serial interfaces typically has between twenty-eight and thirty layers. These multi-layer backplanes are generally complex and expensive to manufacture due to the numerous layers. In addition, multi-layer backplanes generally have a greater opportunity for failure due to the more complex design of the multiple layers and the interaction of the layers and because the greater number of layers and the connections between the layers creates more potential for an error to occur. Also, if the interface conversion functionality of the multi-layer backplane experiences a failure or error, the entire multi-layer backplane may have to be replaced thereby increasing repair costs and increasing the time that the network is down for repair.

When a computer network uses a backplane design as the facility for high speed communication, network redundancy is important so that if a connection within the network is lost, the connection may be quickly reestablished using a redundant line or port. But in multi-layer backplane designs where the backplane converts data transmission to and from the serial interfaces, line and port redundancy is difficult to inexpensively establish since the conversion of the interfaces occurs within the backplane. It may be difficult to reroute data transmissions within the backplane when a connection is lost. The difficulty in reestablishing the connection results from a typically inflexible multi-layer backplane design. In addition, redundancy may also be created by having both a working and protection line where the protection carries the data transmission when the working line experiences a failure. But using two lines for redundancy is costly and uses space on the backplane that may be better utilized or needed for actual data communications and not reserved for redundancy purposes.

SUMMARY OF THE INVENTION

Therefore a need has arisen for a system and method that converts disparate physical interfaces utilizing a less complex and less expensive multi-layer backplane design that increases fault tolerance.

A further need has arisen for a system and method that converts disparate physical interfaces while providing increased redundancy protection.

In accordance with the present invention, a system and method is provided that substantially eliminates or reduces disadvantages and problems associated with previously developed systems and methods for converting disparate physical interfaces. In a backplane design where the backplane is the facility for high speed communication between components, an interface module provides for the conversion of disparate physical interfaces between the components and the backplane thereby resulting in a decrease in the complexity and cost of a multi-layer backplane and an increase in redundancy protection.

In accordance with one aspect of the present invention, the interface module includes one or more serial interfaces. One or more physical modules interface with one or more components having disparate physical interfaces but not having serial interfaces. A conversion module associated with the physical modules and the serial interfaces converts the data transmitted between the physical modules and the serial interfaces. A plurality of queues orders the data transmissions between the components and the serial interfaces.

More specifically, the interface module converts between disparate parallel interfaces and disparate serial interfaces for devices in a computer system or in a computer network. The physical modules interface with components that have disparate types of parallel interfaces while the conversion module and serial interfaces interface with devices having disparate types of serial interfaces. If data is transmitting from the component to the serial interface, then the data must be converted from the parallel data format of the component to a serial data format so that the data may be received and understood by the serial interface. The physical module interfaces with the component having the parallel interface and transmits the data to a first in, first out (FIFO) queue. The data may be temporarily stored in the queue until the conversion module is able to receive the data and convert the data. The conversion module serializes the data so that the data may interface with the serial interface. In addition, the conversion module also performs framing on the serial interfaces to allow for the conversion module and the serial interfaces to interface with devices having disparate serial interfaces The serial interfaces may then communicate the data to the devices having serial interfaces such as the backplane via the serial interfaces. If the data is traveling from the serial interfaces to the component interfaced with the physical module, the conversion module deserializes or parallelizes the data so that the physical module may communicate the data to the physical interface of the component. The conversion module deserializes or parallelizes the data and the data enters into the FIFO queues to be released to the physical module for the physical module to communicate to the component when the component is ready to receive the data.

In one embodiment, a backplane facilitates high-speed communication and the serial interfaces connects to the backplane. The backplane allows two or more of the components having disparate physical interfaces to communicate with the backplane as well as communicate with each other using the backplane. A management module controls the operation of the queues and also determines the route of the data transmitted between the components and the backplane. For instance, if a first component interfaced to a first physical module needs to communicate with a second component interfaced with a second physical module, the management module directs the data from the first component through the first physical module, the queues, and the conversion module to the backplane and then back through the conversion module, the queues, and the second physical module to the second component.

The present invention provides a number of important technical advantages. One important technical advantage is a decrease in the complexity, cost, and number of layers of a multi-layer backplane used as the facility for high-speed communication in a computer system or a computer network. The interface module allows the backplane to be reduced to sixteen layers compared to typical multi-layer backplanes having twenty-eight to thirty layers. The decrease in the number of layers allows for the cost of the backplane to decrease since less layers are required to be manufactured. The decrease in the number of layers also results in a less complex backplane that is less likely to experience a failure since there are less layers for a failure to occur. In addition, if the interface module experiences an error or failure, only the interface module and not the entire backplane needs to be replaced. Replacing only the interface module results in cheaper repair costs and less downtime for the computer system or computer network. Thus, the cost saving in using the interface module and the multi-layer backplane having fewer layers may be passed on to the users so that the cost of the computer system or computer network decreases while the reliability and fault tolerance increases.

Another important technical advantage of the present invention is that the interface module increases the redundancy protection of the computer system or computer network. The serial interfaces within the interface module allow for the interface module to interface with the backplane as well as other devices having disparate serial interfaces. If one of the interface module serial interfaces experiences a failure, the management module may reroute the data transmission to a different serial interface within the interface module so that data transmission is not lost. The ability to reroute data transmissions between different serial interfaces increases the redundancy of the backplane and the system and network by allowing the backplane to more efficiently utilize its serial interfaces for actual communications without unnecessarily reserving serial interfaces on the backplane for redundancy purposes.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention are illustrated in the figures, like numerals being used to refer to like and corresponding parts of the various drawings.

Under previous systems and methods for the conversion of disparate physical interfaces when a backplane is utilized as the facility for high speed communication between network components, a complex and expensive multi-layer backplane is required to convert the different physical interfaces so that the network components may communicate with each other. To reduce the complexity and expense of the multi-layer backplane, the present invention employs an interface module that converts the disparate physical interfaces of the various network components. The interface module allows for a multi-layer backplane having a reduced number of layers that is both less complex and less expensive and allows for greater redundancy protection than the typical multi-layer backplane.

Figure 1:
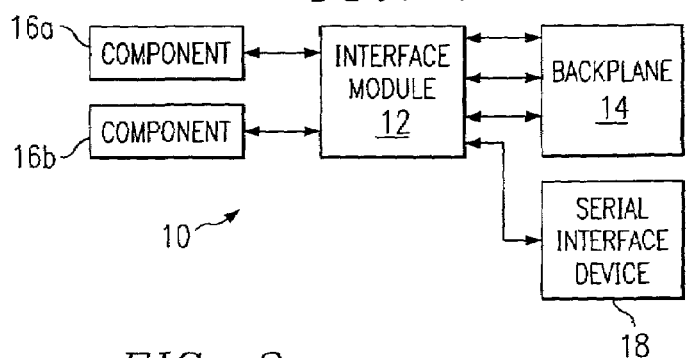
FIG. 1 depicts a block diagram of a computer network utilizing the interface module.

Referring now to FIG. 1, a block diagram depicts an example computer network 10 utilizing interface module 12. Computer network 10 includes interface module 12, backplane 14, and two components 16*a* and 16*b*. In alternate embodiments, computer network 10 may include more or less than two components 16.

Backplane 14 is a printed electronic circuit board with connectors wired together by a set of bussed lines into which additional devices may be plugged in. Backplane 14 is a multi-layer backplane having sixteen layers but in alternate embodiments backplane 14 may have more or less than sixteen layers. Backplane 14 provides a high speed serial interface as the physical interface but does not support any other types of physical interfaces.

Components 16 are computer network components that have a variety of different physical interfaces such as POS-PHY Level 3, ("PL3"), POS-PHY Level 4 ("PL4"), System Physical Interface ("SPI"), XMII, or any other appropriate physical interface. Components 16 support various parallel interfaces but do not support high-speed serial interfaces. Components 16 may be a network processor such as those manufactured by AGERE, INTEL, or MOTOROLA, custom feature cards that provide specific features particular to the users of computer network 10, network interfaces for such transmission technologies as Gigabit Ethernet, 10-Gigabit Ethernet, Asynchronous Transfer Mode ("ATM"), POS ("Packet-over-SONET"), or any other appropriate transmission technologies, application specific integrated circuits ("ASIC"), field programmable gate arrays ("FPGA"), microprocessors, digital signal processors ("DSP"), or any other appropriate network components.

Components 16 utilize backplane 14 as the facility for high-speed communications between components 16 and backplane 14, between two different components 16, or between one component 16 and any other appropriate device having a serial interface such as serial interface device 18. Therefore if component 16a needs to communicate with component 16b, the data transmission needs to travel from component 16a to backplane 14 and back to component 16b. But components 16 support a variety of different parallel physical interfaces but do not support serial interfaces while backplane 14 supports high speed serial interfaces but does not support any other types of physical interfaces. Therefore in order for components 16 to be able to use backplane 14 as the facility for high-speed communication, the data communications between components 16 and backplane 14 must be converted from parallel to serial or from serial to parallel depending on which direction data communications are flowing. For example, if component 16a needs to communicate with component 16b, the data communication leaves component 16a from a parallel interface. In order for backplane 14 to receive and understand the data communication, the data communication needs to be converted so that backplane 14 can receive the data communication at its serial interface. Backplane 14 then needs to send the data communication to component 16b. But component 16b only supports parallel interfaces so the data communication will need to be converted back into a form that can be received and understood by the parallel interface of component 16b. Even if component 16a needs to communicate with backplane 14 or any other serial interface device 18 such as routing or switching devices, the data communication needs to be converted from a parallel interface to a serial interface.

In order to reduce the number of layers on backplane 14 and thereby reduce the complexity and cost of backplane 14, computer network 10 utilizes interface module 12 for interfacing components having disparate physical interfaces and for converting parallel interfaces to serial interfaces and vice versa. Interface module 12 allows components 16 to communicate with backplane 14 and serial interface device 18 as well as each other using backplane 14 when components 16, backplane 14, and serial interface device 18 have disparate physical interfaces.

For instance, component 16a needs to communicate with component 16b. Component 16a supports PL3 as its physical interface while component 16b supports SPI as its physical interface. Component 16a interfaces with interface module 12 using the PL3 physical interface. Interface module 12 receives the data communication from the PL3 physical interface and converts the data communication so that the data communication may be received and understood by the serial interface of backplane 14.

Backplane 14 then needs to send the data communication to component 16b. Since component 16b supports SPI as its physical interface and backplane 14 supports serial interfaces, backplane 14 transmits the data communication to interface module 12 whereby interface module 12 converts the serial data communication from backplane 14 into a parallel data communication that is compatible with the SPI physical interface of component 16b. Once converted from serial to parallel, interface module 12 transmits the data communication to component 16b via the SPI physical interface of component 16b. If component 16b needs to communicate with backplane 14 or serial interface device 18, then interface module 12 converts the data communication coming for the SPI physical interface of component 16b to a serial data format so that the data communication may be understood by either backplane 14 or serial interface device 18.

Figure 2:
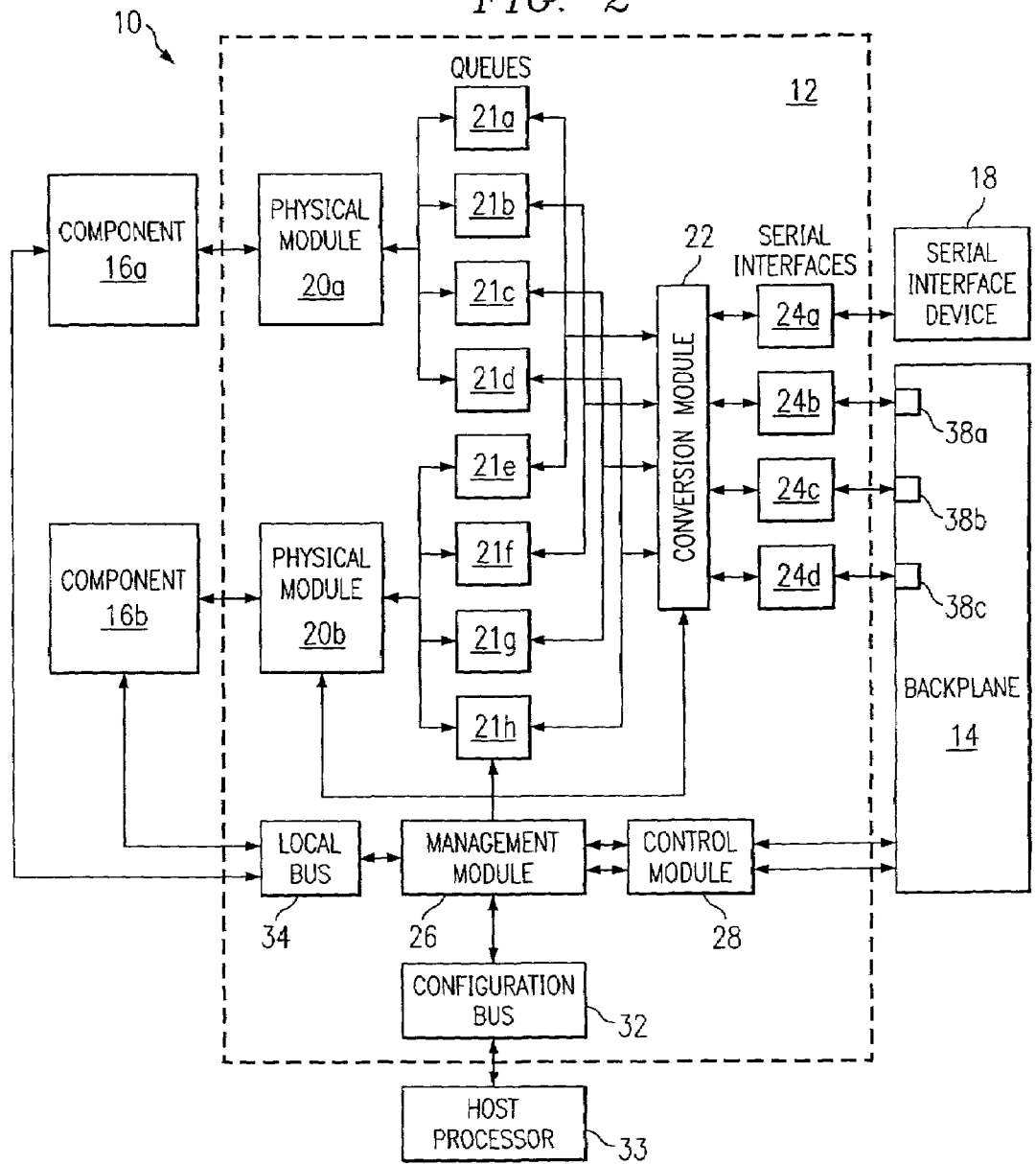
FIG. 2 depicts a block diagram of a computer network illustrating the interface module in greater detail.

Referring now to FIG. 2, a block diagram depicts computer network 10 showing interface module 12 in greater detail. Interface module 12 includes two physical modules 20a and 20b, eight queues 21a–21h, conversion module 22, four serial interfaces 24a–24d, management module 26, and control module 28. Interface module 12 may also include configuration bus 32 which interfaces via a PCI bus to host processor 33 for computer network 10 and local bus 34 which provide an interface with components 16. In alternate embodiments, there may be more or less than two physical modules 20, more or less than eight queues 21, and more or less than four serial interfaces 24.

Physical modules 20 may be field programmable or reprogrammable devices such as field programmable gate arrays that may be configured for a wide variety of applications in the field after manufacture or may be fixed programmable devices that are not reprogrammable such as an ASIC. With regard to interface module 12, physical modules 20 are programmed to interface with a variety of different types of physical interfaces such as PL3, PL4, SPI, and XMII. Configuration bus 32 may program or reprogram physical modules 20 to interface with particular types of physical interfaces. Because physical modules 20 can interface with a variety of different physical interfaces, physical modules 20 have the ability to interface with different components 16.

Conversion module 22 is a serializer/deserializer ("SERDES") integrated circuit such as a fixed programmable device such as an ASIC or a field programmable or reprogrammable device such as a FPGA designed to serialize and deserialize or parallelize data transmissions. Serializing data involves changing a data transmission from a parallel transmission to a serial transmission while deserializing data involves changing a serial data transmission to a parallel data transmission. Conversion module 22 has both a parallel interface and a serial interface so that conversion module 22 may transmit and receive both serial and parallel data transmissions. Conversion module 22 allows for fully integrated, high speed bidirectional data transmissions between components 16 and backplane 14. Conversion module 22 is further operable to perform framing on the serial interfaces thereby allowing for an interface with disparate types of serial interfaces including the high speed serial interfaces of backplane 14 and the serial interfaces of serial interface device 18. Conversion module 22 may interface with different types of serial interfaces and configuration bus 32 may program and reprogram conversion module 22 to interface with particular types of serial interfaces.

In operation, interface module 12 allows for components 16 having disparate physical interfaces to communicate with each other and backplane 14. For example, component 16b having a SPI physical interface needs to communicate with component 16a having a PL3 physical interface. To accomplish this, component 16b interfaces with interface module 12 via physical module 20b. Since physical module 20b is programmable to interface with a variety of different types of physical interfaces, physical module 20b is programmed to interface with a SPI physical interface. Physical module 20b receives the data transmission through the SPI physical interface from component 16b and transfers the data to queues 21 for synchronization of the data and short term storage of the data until conversion module 22 is ready to receive the data.

Queues 21 are bi-directional first in, first out ("FIFO") queues where the first piece of data to enter the queues is the first piece of data to exit the queues. Queues 21 allow interface module 12 to better process the flow of data and eliminate bottlenecks between components 16 and backplane 14 and provide a buffer interface between backplane 14 and conversion module 22 and components 16. Queues 21 free conversion module 22 and backplane 14 from continual interrupts from components 16 and components 16 from continual interrupts from conversion module 22 thereby allowing for more efficient operation of backplane 14, conversion module 22, and components 16. FIFO queues processes data so that the oldest data is processed next and may be dual-port memory units with built-in read and write addressing that unloads data in the same order as the data is written in.

Management module 26 controls the operation of queues 21, how queues 21 order the data, and the route of the data through interface module 12. When physical module 20b receives the data from component 16b, management module 26 determines which queue 21a–21h the data goes into based on the final destination of the data and what other data is currently being processed through interface module 12 and specifically queues 21. If there is a backlog at conversion module 22 or backplane 14, then management module 26 directs the data into one of the queues 21 until conversion module 22 or backplane 14 is ready to receive the data.

Management module 26 utilizes local bus 34 and control module 28 to gather information regarding components 16 and the status of the conversion of the data between components 16 and backplane 14. Local bus 34 interfaces with components 16 and provides control information such as clear to send signals to management module 26. Control module 28 may include a MDIO (Management Data Input/Output) port which is a bi-directional port used for control and gathering status information from components 16 and backplane 14 and a MDC (Management Data Clock) which is a clock used for transferring data via the MDIO port. Control module 28 may also include an I²C (Inter-IC) bus that is a bi-directional two-wire serial bus that provides a communication link between backplane 14 and management module 26 and may also be used as a control and diagnostic bus. Control module 28 interfaces with backplane 14 and management module 26 to enable management module 26 to receive information regarding components 16, backplane 14, the status of the conversion of data, and the status of the operation of interface module 12. Control module 28 receives information regarding components 16 from management module 26 where management module 26 receives component 16 information from the control information provided by local bus 34.

Continuing with the example of component 16b transmitting data to component 16a, from the information provided by control module 28 to management module 26, management module 26 determines which queues 21 the data from physical module 20b shall go into. When conversion module 22 is ready to receive the data, queue 21 releases the data to the parallel interface of conversion module 22. Since the data is a parallel format and backplane 14 can only receive data in a serial format, conversion module 22 converts or serializes the data from a parallel format to a serial format. Once the data is serialized, the data exits conversion module 22 through the serial interface of conversion module 22 and flows to one of the serial interfaces 24.

The ultimate destination of the data determines which serial interface 24 the data passes through. If the data's final destination is backplane 14 or if the data must travel through backplane 14 and return to a different component 16 then the data passes through serial interfaces 24b, 24c, or 24d since these three serial interfaces 24 interface with backplane serial interfaces 38a, 38b, and 38c. If the data is not going through backplane 14 but instead to serial interface device 18, then the data passes through serial interface 24a which does not interface with backplane 14 but instead interfaces with serial interface device 18. Conversion module 22 also determines the type of serial interface needed to interface with either backplane 14 or serial interface device 18.

In the example of component 16b communicating with component 16a, the data needs to pass through serial interface 24b, 24c, or 24d since the ultimate destination of the data is component 16a. For instance, conversion module 22 transfers the serialized data to serial interface 24b which interfaces with backplane serial interface 38a. Since the data needs to end up at component 16a, the data must travel from backplane 14 back through interface module 12 (including physical module 20a) and to component 16a. But the serialized data must be deserialized or parallelized so that the PL3 physical interface of component 16a can receive and understand the data via the PL3 physical interface of component 16a.

Backplane 14 may use any of backplane serial interfaces 38 to transfer the serialized data to conversion module 22. For instance, backplane 14 may transfer the data from backplane serial interface 38b to serial interface 24c to the serial interface of conversion module 22. Conversion module 22 converts or deserializes the data so that it is in a parallel format and the data leaves conversion module 22 via the parallel interface of conversion module 22. Since the data must go to physical module 20a and component 16a, the data flows from conversion module 22 to one of queues 21a–21d since only queues 21a, 21b, 21c, and 21d interface with physical module 20a. When physical module 20a and component 16a are ready to receive the deserialized data from queues 21, management module 26 instructs queues 21 to release the deserialized data in the order the deserialized data was received to physical module 20a. Physical module 20a then transfers the deserialized data to component 16a via the PL3 physical interface and the communication from component 16b to component 16a is complete.

One advantage of interface module 12 is that interface module 12 reduces the complexity and expense of backplane 14. Since the physical interface conversion occurs within interface module 12 instead of backplane 14, the number of layers required in backplane 14 decreases. The decrease in the number of layers allows backplane 14 to be less complex and less expensive to produce because there are not as many layers to manufacture. In addition, because there are fewer layers, the fault tolerance of backplane 14 increases because there are less layers for an error or failure to occur.

Interface module 12 also increases the line and interface redundancy of backplane 14 and computer network 10. Since interface module 12 has multiple serial interfaces 24, if one serial interface 24 experiences an error, the data may still be transferred to backplane 14 via another serial interface 24 allowing the data communication to continue without tying up any backplane serial interfaces 38 with protection lines. Instead of establishing serial interface 24b and backplane serial interface 38a as a redundant or protection path, interface module 12 and management controller 26 can determine the best and most efficient path for the data based on the current operation of computer network 10 when the data is leaving either conversion module 22 or backplane 14. In addition, if interface module 12 experiences an error and needs to be replaced, only interface module 12 and not backplane 14 must be replaced which saves time and money and results in less downtime for computer network 10.

Although the present invention has been described in detail with respect to a computer network, in alternate embodiments interface module 12 may also be utilized in a computer system such as a desktop computer, server, or any other appropriate computer system to provide disparate physical interface conversion.

Although the present invention has been described in detail, it should be understood that various changes, substitutions and alterations can be made hereto without departing from the spirit and scope of the invention as defined by the appending claims.

What is claimed is:

1. An interface module comprising:
   one or more serial interfaces;
   one or more physical modules operable to interface with one or more components having disparate physical interfaces;
   a conversion module associated with the serial interfaces and the physical interfaces, the conversion module operable to convert data transmitted between the serial interfaces and the physical modules; and
   a plurality of queues associated with the physical modules and the conversion module, the queues operable to order the transmission of the data between the physical modules and the serial interfaces.

2. The interface module of claim 1 wherein the serial interfaces comprise disparate serial interfaces.

3. The interface module of claim 1 wherein the queues are further operable to provide short term storage for the data transmitted between the physical modules and the serial interfaces.

4. The interface module of claim 1 wherein the queues are further operable to synchronize the data transmitted between the physical modules and the serial interfaces.

5. The interface module of claim 1 wherein the queues comprise first in, first out storage medium.

6. The interface module of claim 1 further comprising a management module associated with the queues, the management module operable to control the operation of the queues and how the queues order the transmission of the data between the physical modules and the serial interfaces.

7. The interface module of claim 6 wherein the management module is further operable to determine the route of the data transmitted between the physical modules and the serial interfaces.

8. The interface module of claim 6 further comprising a control module associated with the management module, the control module operable to communicate to the management module information regarding the conversion of the data transmitted between the physical modules and the serial interfaces.

9. The interface module of claim 1 wherein the physical module comprises a field programmable device.

10. The interface module of claim 9 wherein the field programmable device comprises a field programmable gate array.

11. The interface module of claim 1 wherein the physical module comprises a fixed programmable device.

12. The interface module of claim 11 wherein the fixed programmable device comprises an application specific integrated circuit.

13. The interface module of claim 1 wherein the physical modules are operable to interface with more than one type of physical interface.

14. The interface module of claim 1 wherein the conversion module is operable to interface with more than one type of serial interface.

15. The interface module of claim 1 wherein the conversion module comprises a field programmable device.

16. The interface module of claim 15 wherein the field programmable device comprises a field programmable gate array.

17. The interface module of claim 1 wherein the conversion module comprises a fixed programmable device.

18. The interface module of claim 17 wherein the fixed programmable device comprises an application specific integrated circuit.

19. The interface module of claim 1 wherein the conversion module deserializes the data transmitted from the serial interfaces to the physical modules.

20. The interface module of claim 1 wherein the conversion module serializes the data transmitted from the physical modules to the serial interfaces.

21. The interface module of claim 1 wherein the serial interfaces are operable to interface with one or more serial interface devices having disparate serial interfaces.

22. The interface module of claim 21 wherein one of the serial interface devices comprises a backplane having a plurality of serial interfaces.

23. The interface module of claim 1 wherein the components that the physical modules interface with have parallel interfaces.

24. The interface module of claim 1 further comprising a configuration bus associated with the physical modules, the configuration bus operable to program the physical modules to interface with a particular type of physical interface.

25. The interface module of claim 24 wherein the configuration bus is further operable to program the conversion module to interface with a particular type of serial interface.

26. A method for disparate physical interface conversion, the method comprising:
   interfacing with one or more serial interfaces;
   interfacing with one or more components having disparate physical interfaces;
   ordering in a plurality of queues data transmitted between the components and the serial interfaces; and
   converting the data transmitted between the components and the serial interfaces from one type of physical interface to another type of physical interface.

27. The method of claim 26 wherein interfacing with one or more serial interfaces comprises interfacing with a backplane having a plurality of serial interfaces.

28. The method of claim 26 wherein ordering the data transmitted between the components and the serial interfaces comprises ordering the data so that the data first received in the queue is the first data to exit the queue.

29. The method of claim 26 further comprising:
   providing short term storage of the data within the queues; and
   ordering the data within the queues.

30. The method of claim 26 wherein converting the data transmitted between the components and the serial interfaces comprises deserializing the data transmitted from the serial interfaces to the components.

31. The method of claim 26 wherein converting the data transmitted between the components and the serial interfaces comprises serializing the data transmitted from the components to the serial interfaces.

32. The method of claim 26 wherein one of the components having disparate physical interfaces comprises a component having a parallel interface.

33. The method of claim 26 further comprising communicating information regarding the components and information regarding the conversion of the data transmitted between the components and the serial interfaces.

34. The method of claim 33 further comprising controlling the operation of the queues based on the information regarding the components and the information regarding the conversion of the data.

35. The method of claim 26 further comprising determining the route of the data transmitted between the components and the serial interfaces.

36. The method of claim 26 wherein interfacing with one or more serial interfaces comprises interfacing with more than one type of serial interface.

37. The method of claim 26 wherein interfacing with one or more components having disparate physical interfaces comprises programming one or more physical modules to interface with the components where the components have a particular type of physical interface.

38. The method of claim 26 wherein interfacing with one or more serial interfaces comprises programming a conversion module to interface with a particular type of serial interface.

39. A system for interfacing disparate physical interfaces, the system comprising:
   a backplane having one or more backplane serial interfaces;
   one or more serial interfaces associated with the backplane, the serial interfaces operable to interface with the backplane serial interfaces;
   one or more physical modules associated with the backplane, the physical modules operable to interface with one or more components having disparate physical interfaces;
   a conversion module associated with the backplane, the conversion module operable to convert data transmitted between the backplane and the components; and
   a management module associated with the backplane and the physical modules, the management module operable to control the transmission of the data between the backplane and the components using a plurality of queues.

40. The system of claim 39 wherein one of the components comprises a network processor.

41. The system of claim 39 wherein one of the components comprises an application specific integrated circuit.

42. The system of claim 39 wherein one of the components comprises a field programmable gate array.

43. The system of claim 39 wherein one of the components comprises a microprocessor.

44. The system of claim 39 wherein one of the components comprises a digital signal processor.

45. The system of claim 39 wherein the queues are operable to provide short term storage and synchronization for the data transmitted between the backplane and the components.

46. The system of claim 39 wherein the physical interfaces for the components having disparate physical interfaces comprise parallel interfaces.

47. The system of claim 39 wherein the conversion module is further operable to:
   deserialize the data transmitted from the backplane to the components; and
   serialize the data transmitted from the components to the backplane.

48. The system of claim 39 wherein two or more of the components having disparate physical interfaces communicate with each other utilizing the backplane.

* * * * *